US009195678B2

(12) United States Patent
Morrison et al.

(10) Patent No.: US 9,195,678 B2
(45) Date of Patent: Nov. 24, 2015

(54) AUTOMATIC SELECTION OF DIGITAL IMAGES FROM A MULTI-SOURCED COLLECTION OF DIGITAL IMAGES

(75) Inventors: Andrew Morrison, Bellevue, WA (US); Chris Park, Seattle, WA (US); Kevin Lau, Issaquah, WA (US); Parthu Kishen, Renton, WA (US); Desmond Smith, Seattle, WA (US); Michael Bibik, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 563 days.

(21) Appl. No.: 13/041,369

(22) Filed: Mar. 5, 2011

(65) Prior Publication Data

US 2012/0188382 A1    Jul. 26, 2012

Related U.S. Application Data (60) Provisional application No. 61/435,757, filed on Jan. 24, 2011.

(51) Int. Cl.
*G06F 17/30* (2006.01)

(52) U.S. Cl.
CPC .... *G06F 17/30247* (2013.01); *G06F 17/30265* (2013.01)

(58) Field of Classification Search
CPC .......... G06F 17/3053; G06F 17/30247; G06F 17/30867; G06F 17/30598; G06F 17/30864; G06F 17/30268; G06F 17/30023
USPC ........ 348/231.99, 231.2, 231.3, 231.5, 231.6; 707/722, 723, 732–734, 736, 737
See application file for complete search history.

(56) References Cited

U.S. PATENT DOCUMENTS

| | | | |
|---|---|---|---|
| 7,003,515 B1 | 2/2006 | Glaser et al. | |
| 7,467,222 B2 | 12/2008 | Kacker | |
| 7,779,117 B2 | 8/2010 | Tessman et al. | |
| 8,589,367 B2 | 11/2013 | Sighart et al. | |
| 8,676,803 B1 * | 3/2014 | Leung et al. | 707/737 |
| 2003/0187844 A1 | 10/2003 | Li et al. | |
| 2004/0025180 A1 | 2/2004 | Begeja et al. | |
| 2006/0203261 A1 | 9/2006 | Kacker | |
| 2008/0141307 A1 | 6/2008 | Whitehead | |
| 2009/0254539 A1 | 10/2009 | Wen et al. | |
| 2009/0292732 A1 | 11/2009 | Manolescu | |
| 2010/0125568 A1 * | 5/2010 | van Zwol et al. | 707/722 |
| 2010/0131500 A1 * | 5/2010 | van Leuken et al. | 707/723 |
| 2011/0182482 A1 | 7/2011 | Winters et al. | |

(Continued)

OTHER PUBLICATIONS

U.S. Appl. No. 13/041,372—Non Final Office Action Mailed Sep. 27, 2012, 8 pages.

(Continued)

*Primary Examiner* — Timothy J Henn (57) ABSTRACT

Described herein are techniques related to automatic selection of one or more digital images from a set of digital images collected from multiple image sources, such as such as digital cameras and camera-equipped mobile phones. The automatic selection is based, at least in part, upon various weighted criteria regarding properties (e.g., metadata or content) of the digital images. The automatic selection and other aspects of the techniques described herein can be performed, at least in part, in or by the so-called cloud. This Abstract is submitted with the understanding that it will not be used to interpret or limit the scope or meaning of the claims.

18 Claims, 6 Drawing Sheets

(56) References Cited

U.S. PATENT DOCUMENTS

| | | |
|---|---|---|
| 2012/0158717 A1 | 6/2012 | Unay et al. |
| 2012/0188405 A1* | 7/2012 | Morrison et al. ......... 348/231.2 |
| 2012/0189284 A1 | 7/2012 | Morrison et al. |
| 2012/0191709 A1* | 7/2012 | Morrison et al. ............ 707/737 |

OTHER PUBLICATIONS

U.S. Appl. No. 13/041,372—Final Office Action Mailed May 22, 2013, 11 pages.
U.S. Appl. No. 13/041,372—Advisory Action Mailed Nov. 7, 2013, 3 pages.
U.S. Appl. No. 13/041,372—Non Final Office Action Mailed May 14, 2014, 12 pages.
U.S. Appl. No. 13/041,372—Notice of Allowance Mailed Feb. 27, 2015, 10 pages.
U.S. Appl. No. 13/041,361—Non Final Office Action Mailed Mar. 14, 2013, 9 pages.
U.S. Appl. No. 13/041,361—Final Office Action Mailed Nov. 6, 2013, 13 pages.
U.S. Appl. No. 13/041,361—Non Final Office Action Mailed Jul. 2, 2014, 14 pages.
U.S. Appl. No. 13/041,361—Final Office Action Mailed Jan. 16, 2015, 20 pages.
U.S. Appl. No. 13/041,370—Non Final Office Action Mailed Oct. 24, 2012, 12 pages.
U.S. Appl. No. 13/041,370—Final Office Action Mailed Jul. 17, 2013, 14 pages.
U.S. Appl. No. 13/041,370—Pre-Brief Appeal Conference Decision Mailed Mar. 4, 2014, 2 pages.
U.S. Appl. No. 13/041,370—Notice of Abandonment Mailed Sep. 9, 2014, 2 pages.
U.S. Appl. No. 13/041,361—Non Final Office Action Mailed Jul. 1, 2015, 15 pages.

* cited by examiner

AUTOMATIC SELECTION OF DIGITAL IMAGES FROM A MULTI-SOURCED COLLECTION OF DIGITAL IMAGES

RELATED APPLICATIONS

This application claims the benefit of priority to U.S. Provisional Patent Application Ser. No. 61/435,757, filed on Jan. 24, 2011, the disclosure of which is incorporated by reference herein.

BACKGROUND

With the widespread use of digital consumer electronic image-capturing devices such as digital cameras and camera/video phones, the size of each consumers' digital image collections continue to increase very rapidly. As such collections grow ever larger and increasingly more unwieldy, a person is less able to handle the sheer volume of images in these collections.

Each individual photographer may capture hundreds or perhaps thousands of digital photographs and videos at a single event (such as a wedding or a party) using an image-capturing device. Later, sometimes long after the event is over, the individual photographer may organize the many captured photographs by manually sifting through them using the available conventional approaches for doing so.

After each individual photographer painstakingly cobbles together their "best" photographs from their personal stockpile of such phonographs taken at a particular event, the best collective result is a group of the subjectively "best" photographs for each photographer. For example, with ten photographers at an event, there will be ten groups of each photographer's "best" photographs. There is no single collection of the "best" photographs from all of the photographers.

Accordingly, there is no existing solution to produce and see a single group of the "best" photographs selected from a collection of photographs taken by multiple photographers at a particular event.

SUMMARY

Described herein are techniques related to automatic selection of one or more digital images from a set of digital images collected from multiple image sources, such as such as digital cameras and camera-equipped mobile phones. The automatic selection is based, at least in part, upon various weighted criteria regarding properties (e.g., metadata or content) of the digital images. The automatic selection and other aspects of the techniques described herein can be performed, at least in part, in or by the so-called cloud.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components

DETAILED DESCRIPTION

Described herein are techniques related to automatic selection of one or more digital images from a set of digital images collected from multiple image sources (such as digital cameras or camera-equipped mobile phones). The automatic selection is based, at least in part, upon various weighted criteria regarding properties (e.g., metadata or content) of the digital images (simply "photos" herein). The automatic selection and other aspects of the techniques described herein can be performed, at least in part, in or by the so-called cloud. As such, at least a portion of the described techniques may be performed by and with computing resources available via a network infrastructure (such as the Internet). The users of the cloud-based computing resources typically have no knowledge of the location (both physically and network-addressably) and character of such resources.

Using their personal image-capturing devices (such as smartphones with a camera) at a wedding, for example, some of the friends of the bride and the friends of the groom may take many photographs during the happy occasion. Collectively, these photographers may collectively accumulate a very large stockpile of photos that surely the bride, groom, their families, and most of the other attendees would like to see.

With conventional approaches, each photographer must manually sift through their individual large collection to find their "best" photos. Conventionally, sharing those personal "best" photos typically involves sending those photos to others and/or posting the photos (e.g., on a social networking service or a photo/video sharing service) for linked friends to see. Unfortunately, this conventional approach to photo sharing requires each "share-ee" of the leaf through each "share-ors" own group of photos that they thought was their best. Conventionally, there is no one group of "best" photos culled from photos taken by several of the photographers at the event.

Fortunately, using the new techniques described herein, each "share-ee" need only view a single group of "best" photos that are automatically selected from a common collection of each "share-ors" own stockpile of photos taken at the common event (such as the wedding). Since the "best" photos are automatically selected, each individual photographer is spared the task of painstakingly sifting through their personal stockpile to find their "best" photos. Moreover, the auto-selection and other aspects of the new techniques described herein allow for the overall "best" photos to be shared right after the event takes place. Indeed, the shared group of overall "best" photos may be shared while the event is still occurring and updated later as more photos become available.

The following co-owned U.S. Patent Applications are incorporated by reference herein:

U.S. Provisional Patent Application Ser. No. 61/435,757, filed on Jan. 24, 2011;

U.S. patent application Ser. No. 13/041,361, titled "Automatic Selection Of Digital Images With An Apparatus," filed on Mar. 5, 2011;

U.S. patent application Ser. No. 13/041,370, titled "Automatic Highlight Reel Producer," filed on Mar. 5, 2011; and U.S. patent application Ser. No. 13/041,372, titled "Automatic Sharing of Superlative Digital Images," filed on Mar. 5, 2011.

Exemplary Scenario

Figure 1:
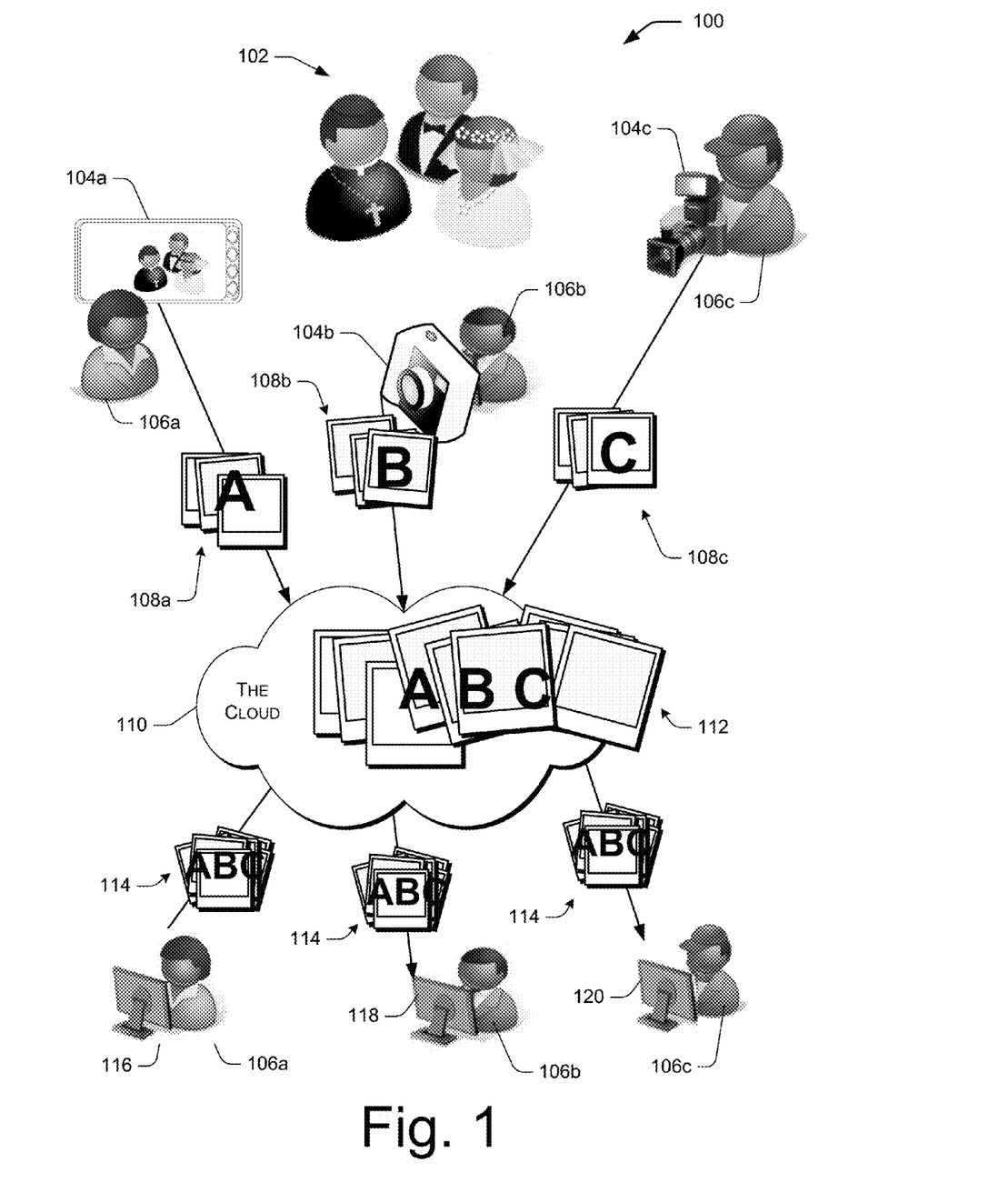
FIG. 1 illustrates an exemplary scenario in which the techniques described herein for automatic selection of one or more digital images from a multi-sourced collection of such images.

FIG. 1 depicts an exemplary scenario 100 to illustrate how the techniques described herein may be employed to implement a cloud-based automatic photo selection using photos sourced from multiple image-capturing devices. The exemplary scenario 100 depicts a wedding 102, which is an example of a common event.

Herein, an event is characterized by location and time. Other examples of events include (but are not limited to): a party, a vacation, a convention, a fundraising gala, a field trip, a sporting match, a newsworthy happening, a storm, a traffic incident, a graduation, a birth, a calamity, a celebrity sighting, a press conference, a business meeting, a retreat, a kids camp, a religious gathering, and the like. Of course, a common event is an example of common property being described in this scenario, but alternative implementations may group photos from multiple sources based upon one or more common characteristics or properties rather than just a common event.

The exemplary scenario 100 shows various different people taking photographs of the wedding 102 using various different photo-taking devices. Using her camera-equipped smartphone 104a, Alexa 106a (i.e., user A) takes her group 108a of photos and such photos are uploaded to the cloud 110. Using his digital camera 104b, Ben 106b (i.e., user B) takes his group 108b of photos and such photos are uploaded to the cloud 110. Using his DSLR (digital single lens reflex) camera 104c, Christian 106c (i.e., user C) captures his group 108c of photos and such photos are uploaded to the cloud 110. Each of the image-capturing devices (104a, 104b, 104c) has a wireless telecommunications link (e.g., cellular, Wi-Fi™, or the like) to the Internet. Via this link, each device uploads its captured photos to the cloud 110. Alternatively, one or more of the image-capturing devices may upload information about and/or a link to the captured photos to the cloud 110 instead of the photos themselves.

A common set 112 of photos taken at the same event 102 are collected in the cloud 110. The common set 112 includes the photos 108a, 108b, and 108c uploaded from each of the image-capturing devices (104a, 104b, 104c). Based upon the common set 112 of photos taken at the same event 102 (or alternatively from the information about such photos), an auto-selection is performed in the cloud 110 to produce a superlative subset 114 of the "best" photos taken at the same event 102 by Alexa, Ben, and Christian (106a, 106b, and 106c). The superlative subset is selected from amongst all of the photos taken at the same event 102 by Alexa, Ben, and Christian (106a, 106b, and 106c) and then subsequently uploaded to the cloud 110. The auto-selection and other related operations performed within the cloud 110 are discussed in more detail later (e.g., in relation to FIGS. 2-4).

Using a user-interface on their own computing device and a link to the cloud 110, each user may view any of the photos in the superlative subset 114 of photos regardless of who actually took photo being viewed. To illustrate this, the superlative subset 114 of photos is depicted as being downloaded to each of the cloud-connected computers (such as 116, 118, 120). For example, Alexa 106a is shown viewing, via a web-interface, the superlative subset 114 on her cloud-connected computer 116. Ben 106b and Christian 106c are shown doing the same thing on their cloud-connected computers.

Exemplary Processes

Figure 2:
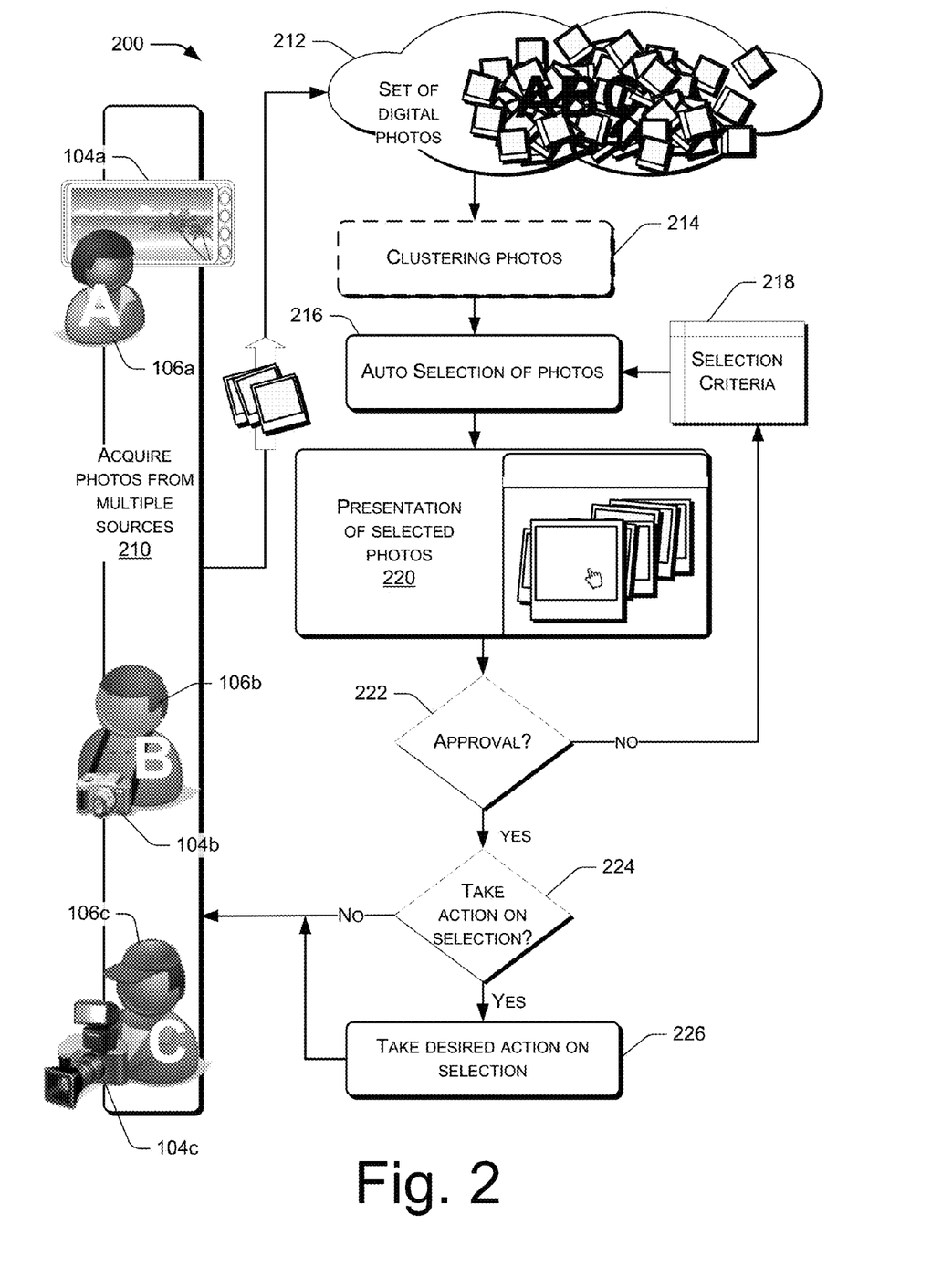
FIGS. 2-4 are flowcharts of processes that are configured to implement the techniques described herein for automatic selection of one or more digital images from a multi-sourced collection of such images.
Figure 3:
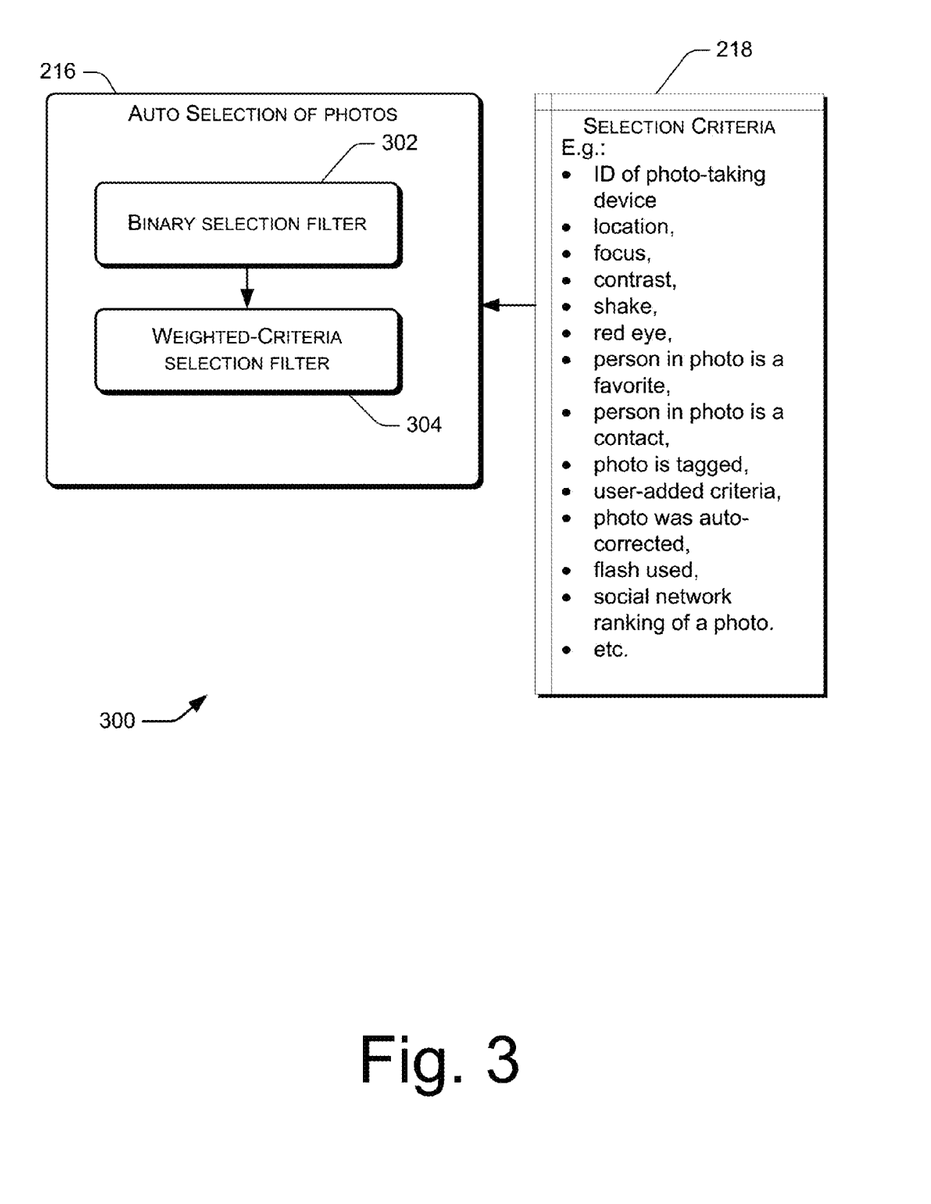
Figure 4:
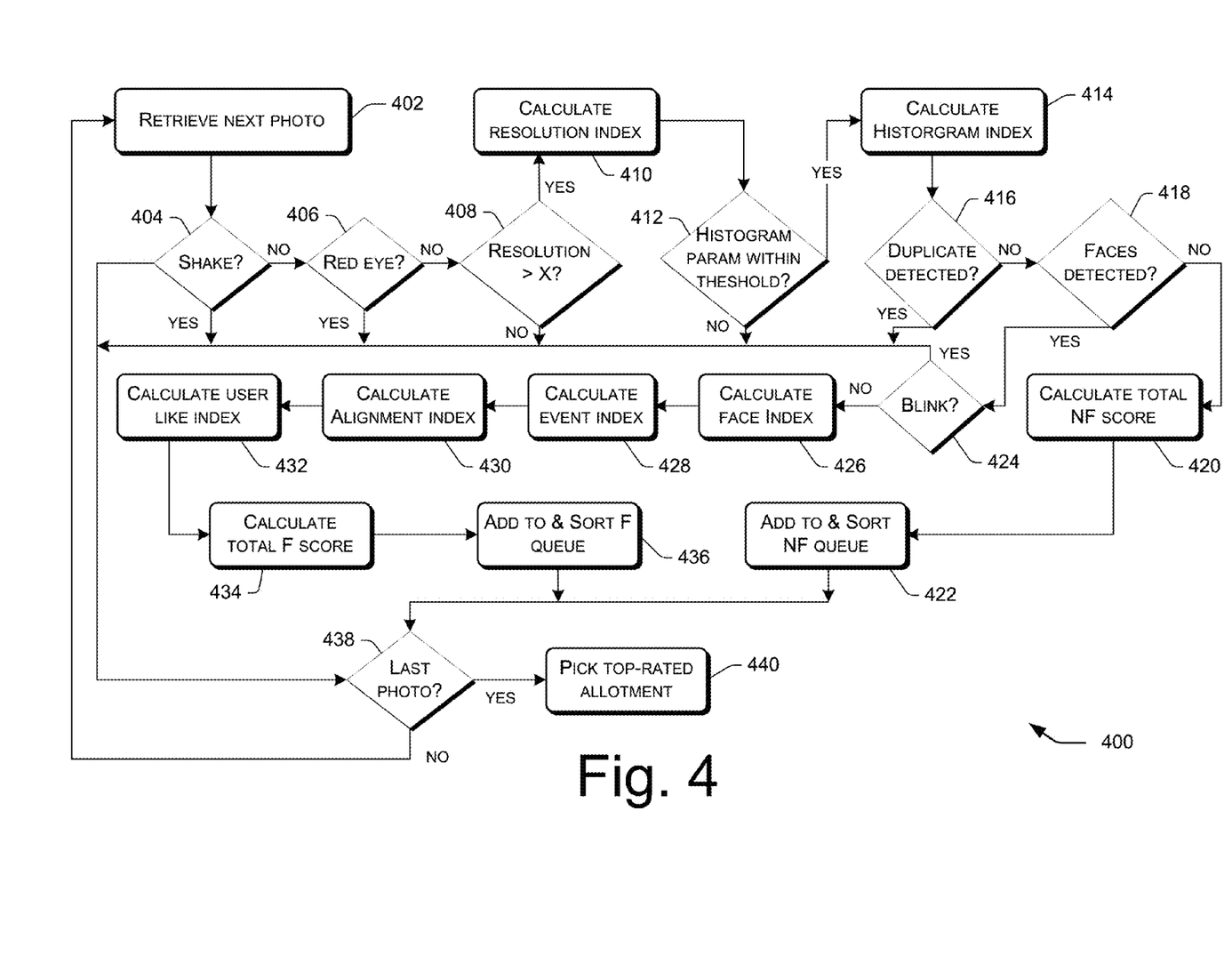

FIGS. 2-4 are flowcharts illustrating exemplary processes 200, 300, and 400 that implement the techniques described herein for automatic photo selection from a set of photos from multiple sources. The exemplary processes 200, 300, and 400 are performed, at least in part, by computing resources of a network or cloud-computing infrastructure like that depicted in FIG. 5. Portions of the exemplary processes may be performed, at least in part, by image-capturing devices like 104a, 104b, and 104c of FIG. 1.

The process 200 starts, at 210, with an acquisition of original or additional photos of a set 212 of digital images (i.e., photos) in the cloud. The photos are acquired from multiple sources. For example, the image-capturing devices (104a, 104b, 104c) are multiple sources of the photos taken by Alexa, Ben, and Christian (106a, 106b, 106c) at a common event. The photos from each source (e.g., 104a, 104b, 104c) are uploaded to the cloud and form the new set, or are added to the existing set 212, of photos.

Of course, the set 212 of photos may be updated via other sources such as from other camera-equipped devices, from other non-camera-equipped devices, from the Internet (e.g., email, social networking service, website, etc.), or some cloud-computing infrastructure resource. The box representing the photo-acquisition operation 210 is vertically long and horizontally narrow so as to indicate that this operation may occur while the other to-be-described operations are performed.

Next, at operation 214, one or more cloud-computing resources cluster photos of the photo set 212 based on one or more criteria, such as location, time, date, and calendar information from one or more events, such as those on private and/or publicly available calendars. Additionally, the clustering criteria may also consider event specifics, such as faces in a series of images, colors associated with images, overall brightness, color similarities or dissimilarities, and scene information. Clusters of images may be multilayered. For example, a cluster of wedding images may have a number of secondary clusters. One secondary cluster may include images of just the groom and bride, where another secondary cluster may include images of just the bridesmaids.

In FIG. 2, operation 214 is shown as a dashed box to indicate that it is optional and in some implementations may not include any clustering. In some other implementations, the clustering may occur after the auto-selection of the next operation (at 216) instead of, and perhaps in addition to, occurring before the auto-selection. The clustering criteria may include and overlap with the selection criteria 218.

After that, at 216, one or more cloud-computing resources auto-select a subset of the set 212 of digital photos. As used herein, the subset presumptively includes some but not all of the digital images of the set 212. Alternatively, when the clustering operation 214 is performed, one or more cloud-computing resources auto-select a subset of one of the clusters or perhaps across multiple clusters.

Typically, the selected subset includes the superlative digital images from the set 212 of digital images. As used herein with regard to digital images, the term "superlative" refers to a subset of digital images having the highest kind, quality, or order with respect to the other digital images of a set. For example, digital images that are top-ranked or bottom-ranked in some category or characteristic are superlative. Also, for example, digital images considered the "best" or "worst" of the set are considered superlative.

The auto-selection is based upon one or more weighted selection criteria 218 of one or more properties of the photos. FIG. 3 provides more information regarding both the auto-selection operation 216 and the selection criteria 218. The auto-selection operation 216 may be designed to find the "best" photos (i.e., the top-ranked photos). Alternatively, it may be designed to find the "worst" photos (i.e., the bottom-ranked photos).

At 220, one or more cloud-computing resources present the auto-selected subset of photos to a user (such as Alexa 106a) via a user interface (of a telecommunication device or a cloud-connected computer device). Via the user-interface, a user (such as Ben 106b) indicates his approval of the auto-selected subset of photos. By approving, Ben may be, for example, agreeing that the auto-selected subset of photos represents the "best" photos in his subjective opinion. Conversely, by disapproving, Ben may be, for example, disagreeing that the auto-selected subset of photos represents the "best" photos in his subjective opinion.

At 222, the one or more cloud-computing resources attain feedback from one or more users regarding the auto-selected subset of photos. The cloud resources determine whether the user input indicates approval of the auto-selected subset of photos. If not approved, then one or more cloud-computing resources may update (i.e., adjust or alter) the weight values assigned to one or more of the selection criteria 218 and the process returns to the auto-selection operation 216 to perform a reweighted selection of the photos based upon the now updated criteria. If that happens, then one or more cloud-computing resources automatically reselect an updated subset of the set 212 of digital photos. Alternatively, when the clustering operation 214 is performed, the one or more cloud-computing resources automatically reselects an updated subset of one of the clusters, or perhaps across multiple clusters. If the user input indicates, at 222, that the user disapproved, the process proceeds to operation 224.

In one or more implementations, a user (such as Christian 106c) may indicate his disapproval by him choosing to remove or add one or more photos from/to the auto-selected subset. In the same implementation or others, one or more cloud-computing resources may "learn" the types of images that a particular user prefers or does not prefer based on iterations of approval and disapproval by that user. When a user removes a photo from the subset, the one or more cloud-computing resources reduces the weight values for the removed photo's strong properties and/or increases the weight values for the removed photo's weak properties. And vice versa for the photos that the user manually adds to the subset. Alternatively, the one or more cloud-computing resources may "learn" generally what a particular group of users like or dislike about the all users' preferences Using machine learning techniques, the multiple iterations hone the weight values assigned to various weighted selection criteria.

In one or more implementations, the user 202 may indicate his disapproval by him choosing to remove or add one or more photos from/to the auto-selected subset. In the same implementation or others, the device 204 may "learn" the types of images that a user prefers or does not prefer based on iterations of approval and disapproval by the user. When a user removes a photo from the subset, the device 204 reduces the weight values for the removed photo's strong properties and/or increases the weight values for the removed photo's weak properties. And vice versa for the photos that the user manually adds to the subset. Using machine learning techniques, the multiple iterations hone the weight values assigned to various weighted selection criteria.

At 224, one or more cloud-computing resources (or an app running on the cloud-connected device) determine whether input from a particular user (most likely in addition to the user input regarding approval) indicates whether to take a defined action upon the subset of photos and/or which of several possible defined actions to take upon the subset. If the user does not want any defined action, then the process returns to the beginning operation at 210. If the user wants a defined action to be performed upon the subset, then the process proceeds to action operation at 226.

In FIG. 2, operations 222 and 224 are shown as dashed boxes to indicate that each is optional and some implementations may offer users these choices and some may not. Alternatively, one or more cloud-computing resources may perform one or more defined actions by default. Alternatively still, particular users may have pre-set whether and/or which one or more of the defined actions will be performed upon the auto-selected subset.

At 226, one or more cloud-computing resources perform one or more defined actions on the auto-selected subset of photos. Presuming the photos are top-ranked (i.e., "best"), the defined actions include (by way of example and not limitation): archiving, sharing, printing, converting/reformatting, and the like. Presuming the photos are bottom-ranked (i.e., "worst"), the defined actions include (by way of example and not limitation): deleting, recycling, and the like.

After the one or more actions are performed on the subset, the process returns to the photo-set updating operation 210. The operations 214 through 226 may be performed in real-time with the photo-set updating operation 210.

FIG. 3 shows the process 300 and offers more details regarding the auto-selection operation 216 and the selection criteria 218. The auto-selection operation 218 includes a binary selection filter operation 302 followed by a weighted-criteria selection filter operation 304. At 302, one of more of the criteria 210 may be applied as a binary filter to, for example, remove photos that do not meet the one or more criteria. After that, at 304, one or more of the criteria are applied in a weighted manner.

Generally, the main purpose of the binary selection filter operation 302 is to remove outright "bad" photos. So, it could be called the bad-photo filter. A bad photo is one where the content is difficult for a human to discern and simple post-processing is not likely to make the content discernable. The binary filter may use one or more criteria related to one or more properties that might make a photo be considered "bad." Examples of such "bad photo" criteria include (but are not limited to): shaky, blurry, over or under exposed, poor resolution, poor contrast, out-of-focus, red-eye, and the like. Red-eye might not be part of the binary selection filter operation 302 in some implementations because it can be removed with some post-processing.

Some implementations may not employ the binary selection filter operation 302. Those implementations may rely upon the weighted-criteria selection filter operation 304 to remove the "bad" photos.

Alternatively, the binary selection filter operation 302 may be described as grouping the set 212 of digital images into an intermediate grouping that includes two or more of the digital images of the set 212. Similarly, the weighted-criteria selection filter operation 304 may be alternatively described as ranking the digital images of the intermediate grouping based upon one or more of the multiple weighted criteria 218 and designating an allotment of top-ranked (or bottom-ranked)

digital images of the intermediate grouping as the selected subset of digital images that results from the auto-selection operation 216.

The size (i.e., number, cardinality) of the allotment may be a fixed number (e.g., ten) or calculated. If fixed, the allotment size may be a factory-set default number or a user-defined number. If calculated, the calculation may be, for example, based upon linear or non-linear proportions of the quantity of photos in the set 212, in one or more clusters, in the intermediate grouping, and/or the like. These proportions may be factory-set or user-defined. A percentage is an example of such proportions.

For example, the allotment size for the subset may be user-defined to be five percent of the set 212 of photos. If, for this example, the set 212 included twelve-hundred sixty-two photos, then the allotment size would be sixty-two (with truncation). Consequently, a user (such as Alexa 106a) would be presented with sixty-two photos for her approval.

Typically, the criteria used for the binary filtering differ from those used for the weighted filtering. However, in some implementations, the criteria used for one may overlap the criteria used for the other. The criteria are related to properties of a photo. Those properties may be derived from the content of the photo (based upon an image analysis) and/or from metadata associated with the photo. Examples of photo metadata include (but are not limited to): technical metadata (such as size, resolution, color profile, ISO speed and other camera settings), descriptive metadata (captions, headlines, titles, keywords, location of capture, etc.), and administrative metadata (such as licensing or rights usage terms, specific restrictions on using an image, model releases, provenance information, such as the identity of the creator, and contact information for the rights holder or licensor).

The weighted selection criteria 218 include (by way of example and not limitation): identification of the photo-taking device, identification of the photographer, location of image-capture, focus, contrast, shake, red eye, person in photo is a favorite (e.g., in a social network or on the device), person in photo is a contact, photo is tagged (in general or with a particular tag), user-added criteria, photo was auto-corrected, flash was used, social network ranking of a photo, etc.

FIG. 4 illustrates the process 400 for determining a best photo that may be used with embodiments described herein. This process 400 may be employed as part of process 200 and/or process 300 herein.

The process 400 starts with operation 402 where the device retrieves the next photo (or the first when initially executed) from a memory like that of image-storage unit 140 of device 110. Next, at 404 and 406, a determination is made if the retrieved photo is shaky or if redeye is detected. If so, a next photo is retrieved and the process 400 starts again with that next image. If the retrieved photo is the last (as determined at operation 438), then the process 400 proceeds to a photo-ranking operation 440, which is discussed later.

If no shake or redeye is detected in a clip, then the process 400 continues onto operation 408 where it is determined if the resolution of the retrieved photo is greater than a defined threshold resolution. If not, then a next photo is retrieved and the process begins again. If so, based on the resolution of the image, a resolution index is determined or calculated at operation 410. In one example, the resolution index may be determined or calculated based on the resolution (megapixels) associated with a photo undergoing consideration. Next, at 412, the process determines if the histogram associated with the photo is within a defined threshold. If not, then a next photo is retrieved and the process begins again. If so, based on the histogram of the photo, a histogram index is determined or calculated at 414. In one example, the histogram index is determined or calculated based on a consideration of the number of "dark" pixels (underexposure), "bright" pixels (overexposure), and/or the number of pixels that fall between the underexposure and overexposure range.

Next, the process continues, at 416, to determine if a duplicate photo of the one currently being processed is stored in the device or otherwise known or available. If so, a next photo is retrieved and the process begins again. If not, the process determines, at 418, if one or more faces are detected in the photo. If no faces are detected in the photo, the process calculates, at 420, a NF ("no face") photo score based on the calculated resolution index and histogram index, and associates the NF score with the photo and adds the photo to a "no face" image queue at 422. If one or more faces is detected, the process determines, at 424, if a subject in the photo has their eyes shut or partially shut (i.e., "blink detection"). If a blink is detected, a next photo is retrieved and the process begins again.

If no blink is detected, the process calculates face, event, alignment and user like indexes at operations 426, 428, 430, 432, respectively. In one implementation, the face index calculation considers if one or more expected or desired faces are in a photo, the event index calculation considers if an expected event (e.g., wedding or party) is part of a photo, the alignment calculation considers a degree of alignment (e.g., vertical or horizontal) of a photo and the user like index considers a relative user acceptance or approval (e.g., like or dislike) of one or more faces in a photo. These indexes and the previously calculated indexes associated with resolution and histogram are considered when calculating an F ("face") photo score at 434. The face image score is associated with the photo and the photo is added to a face queue at 436.

Each time a photo is added to a queue, the queue is automatically resorted based on scores associated with an already processed and queued photo. Once the last photo is processed (as determined by operation 438), the process picks the highest scored photo as the best photo at 440. In addition, operation 440 may also select, based on photo score, an allotment of photos for presentation to a user of the portable device.

In alternative implementations, other criteria (like those of 218 in FIGS. 2 and 3) and/or different permutations of criteria may be employed at operations 404, 406, 408, 416, 418, and 424. For example, with operations 404, 406, and 408 other "bad photo" type criteria may be used and with operations 416, 418, and 424 other weighed selection criteria may be employed.

Exemplary Cloud-Based Environment

Figure 5:
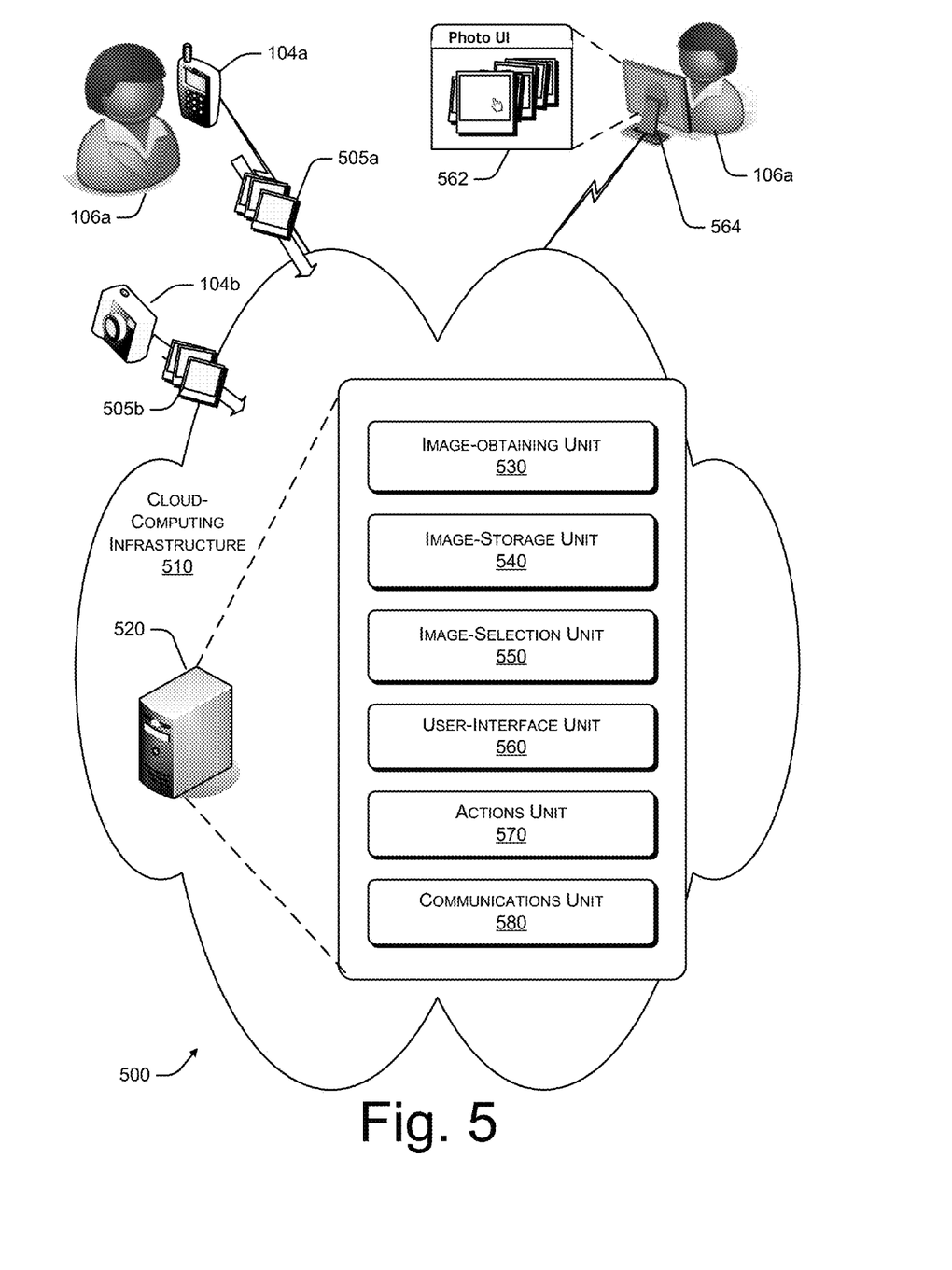
FIG. 5 illustrates exemplary cloud-based environment within which the techniques described herein may be implemented for automatic selection of one or more digital images from a multi-sourced collection of such images.

FIG. 5 illustrates an exemplary cloud-based environment 500 in which the techniques described herein may be implemented. Alexa 106a is again depicted with her camera-equipped smartphone 104a. The smartphone 104a may be configured to send one or more photos 505a captured or acquired by the smartphone to a cloud-computing infrastructure 510. Likewise, digital camera 104b is configured to send one or more photos 505b captured or acquired by the camera to the cloud-computing infrastructure 510, In many cases, an exemplary image-capture device (such as smartphone 104a) will be what is commonly referred to as a "mobile phone," "smartphone," or "cellphone." However, the described techniques can be used in conjunction with non-cellular technologies such as conventional analog AM or FM radio, Wi-Fi™, wireless local area network (WLAN or IEEE 802.11), WiMAX™ (Worldwide Interoperability for Microwave Access), Bluetooth™, and other analog and digital wireless voice and data transmission technologies. Alternative implementations of such devices might not have any telecommunications or wireless communication capability. Still other alternative implementations may utilize a wired communication link instead of or in addition to wireless communication.

The exemplary devices (like smartphone 104a) are not limited to those having a camera. Any device with the capability to acquire, collect, and/or manipulate digital images may implement some aspect of the techniques discussed herein. Examples of such alternative devices include (but are not limited to) the following: tablet-based computer, other handheld computer, netbook, computer, digital camera, digital camcorder, handheld multimedia device, GPS navigational system, vehicle-based computer, or other portable electronics.

Within the cloud-computing infrastructure 510 exists one or more cloud-computing resources which implement, at least in part, the techniques described herein. The cloud-computing infrastructure 510 may provide computing resources and data storage may be provided via linked data centers. Each of the data centers may include a plurality of servers that provide computing resources, as well as data storage and retrieval capabilities. Users of the cloud-computing infrastructure 510 generally do not need knowledge regarding or control over the underlying data center infrastructure of the cloud. Rather, the users may access the computing resources and data storage capabilities on an as-needed basis. While depicted in FIG. 5 as the cloud-computing infrastructure, item 510 may alternatively be viewed as a network or the Internet.

The relevant cloud-computing resources are depicted here as a server 520. The server 520 may be or be part of a web server, data center, or other computing resource. The server 520 is shown in an expanded view and includes, for example, an image-obtaining unit 530, an image-storage unit 540, an image-selection unit 550, a user-interface unit 560, an actions unit 570, and a communications unit 580.

Each of these units may be implemented (at least in part) by a set of processor-executable instructions (e.g., software modules). Furthermore, each of these units may include or employ one or more lower-level components of the server 520. For example, these lower-level components include processors, memory, storage, video display, user-input device (e.g., keyboard), transceiver, and the like. Alternatively, each of these units and/or some or all of their functions may be distributed across multiple servers and other resources in the cloud-computing infrastructure 510. Alternatively still, each of these units and/or some or all of their functions may be distributed across multiple cloud-connected devices, such as device 104a.

The image-obtaining unit 530 is configured, designed, and/or programmed to acquire digital images from multiple sources (such as cloud-connected image-capture devices like smartphone 104a). The image-obtaining unit 530 includes various image finding, formatting, conversion, processing, and/or analysis components. The image-obtaining unit 530 may be implemented, at least in part, by a software module resident, at least in part, in a memory and executed by one or more processors.

In addition, the image-obtaining unit 530 may include or have associated therewith an image-handling software module (e.g., application) that may be used to enhance an amount of information recorded in the image file relating to the captured digital images. For example, the image-handling application may use information from other sources and/or applications to add data to the image files (e.g., JPEG (Joint Photographic Experts Group), TIFF (Tagged Image File Format), RAW, PNG (Portable Network Graphics), etc.) that the captured digital images are stored on the image-storage unit 540. This added data may be called "metadata." Specifically, the image-handling application may be configured to obtain information from other hardware, firmware, or software components to add data to the image files. Examples of other components include (but are not limited to) a location application, a calendar application, and/or a contacts application running.

Additionally, the image-handling application may be designed to enhance user functionality once images have been acquired. For example, the image-handling application may also be configured to display images to the user in cooperation with or as part of the image-interaction unit 560. The image-handling application may include various filters or criteria used to limit the number of images displayed/sent to the user. As discussed below, these filters or criteria may be user selectable, may use the data in the image file obtained from non-image sources or applications, may be configured based on data in the image files, etc. As another example, similar filters or criteria may also be used to cluster images into folders (such as virtual albums, system file folders, etc.). As still another example, the image-handling application may use data stored in the image files, contact information, calendar information, and/or upload information to increase the ease of sharing images.

The image-handling application may be limited to a particular type of digital image (e.g. still images (photographs), moving images (video), etc.) or may be configured to handle multiple types of images. In addition, the image-handling application may be a stand-alone application, or may be integrated into other applications or other units. Moreover, the image-handling application may be formed by a combination of functions of separate, distinct programs or units of the server 520.

The image-storage unit 540 is configured, designed, and/or programmed to store digital images and possibly other forms of data and software. That is, the server 520 stores the photos acquired by the image-obtaining unit 530 from multiple sources (smartphone 104a and digital camera 104b).

The image-storage unit 540 includes one or more lower-level memory or storage components for storing still digital images (i.e., photographs or photos) and/or moving digital images with audio (i.e., digital video). The memory or storage components may be volatile or non-volatile, dynamic or static, read/write-able or read only, random- or sequential-access, location- or file-addressable, and the like. The memory or storage components may be magnetic, optical, holographic, and the like. The memory or storage components may be internal to the server 520, attached externally to the server 520, or available via data communications (e.g., as a cloud-based resource).

The image-selection unit 550 is configured, designed, and/or programmed to automatically select a group of top-ranked (or alternatively bottom-ranked) photos of a collection of such photos stored by the image-storage unit 540, which are presumably acquired from multiple image-capturing sources. Alternatively, the image-selection unit 550 may cluster the collection of photos before the auto-selection is performed. Alternatively still, the image-selection unit 550 may cluster the auto-selected group of photos after the auto-selection is performed.

The image-selection unit 550 shown in FIG. 5 is implemented as a software module which would reside, at least in part, in the memory and be executed by one or more processors. Alternatively, the image-selection unit 550 may be implemented as a collection of, or as part of, dedicated hardware or firmware. Alternatively still, the image-selection unit 550 may be implemented as a combination of hardware, firmware, or software.

The user-interface unit 560 is configured, designed, and/or programmed present an auto-selected photo user interface, like photo UI 562, to a user and perhaps obtain feedback. For example, using the photo UI 562 on a cloud-connected computer 564, Alexa 106*a* may view the auto-selected photos and, in some implementations, provide feedback. That feedback may indicate her approval of or disapproval of the photos that were auto-selected. Of course, other users may view the photos and provide feedback as well.

The user-interface unit 560 is implemented as a software module which resides, at least in part, in the memory and can be executed by one or more processors. Alternatively, the image-selection unit 550 may be implemented as a collection of or as part of dedicated hardware or firmware. Alternatively still, the image-selection unit 550 may be implemented as a combination of hardware, firmware, or software.

The actions unit 570 is configured, designed, and/or programmed to automatically perform a defined action on each photo in a group of top-ranked (or alternatively bottom-ranked) photos of a collection of such photos stored by the image-storage unit 540. Presuming the photos are top-ranked, the defined actions include (by way of example and not limitation): archiving, sharing, printing, conversion/reformat, and the like. Presuming the photos are bottom-ranked, the defined actions include (by way of example and not limitation): deleting, recycling, and the like.

Archiving photos involves storing photos in a different and perhaps more reliable location. Sharing photos includes sending copies of the photos to another person via one or more various ways of sending such data or notices of the same. Alternatively, sharing photos includes sending a link to one or more of the photos via one or more various ways of sending such links or notices of the same. Examples of such ways to send photos, links, and/or notices thereof include (but are not limited to): email, posting on a social network, posting on a blog or website, text message, MMS (multimedia messaging service), and the like. Printing photos is much like sharing photos, but the destination is a printer capable of printing the shared photos. Also, the photos may be automatically converted or reformatted in a pre-defined manner.

Deleting photos involves permanently removing the photo from the image-storage unit 540. Recycling photos involves placing the photo into a queue of files to be deleted later. This queue is sometimes called the "trash" or "recycle bin."

The actions unit 570 shown in FIG. 5 is implemented as a software module which would reside, at least in part, in the memory and be executed by one or more processors. Alternatively, the actions unit 570 may be implemented as a collection of or as part of dedicated hardware or firmware. Alternatively still, the actions unit 570 may be implemented as a combination of hardware, firmware, or software.

The communications unit 580 is configured, designed, and/or programmed to transmit (and/or receive) notifications of, links to, and/or copies of digital photos through and possibly outside of the cloud-computing infrastructure 510 and onto another user or device accessible from that infrastructure.

The communications unit 580 includes various lower-level communications components for sending and/or receiving data communications from/by the resources of the cloud-computing infrastructure 510. Using a transceiver, transmitter, receiver, network interface controller (NIC), and the like, the communications unit 580 utilizes wired (e.g., universal serial bus (USB) or Ethernet) or wireless communications. Examples of wireless communications are (by way of example and not limitation): cellular, satellite, conventional analog AM or FM radio, Wi-Fi™, wireless local area network (WLAN or IEEE 802.11), WiMAX™ (Worldwide Interoperability for Microwave Access), and other analog and digital wireless voice and data transmission technologies. The communications unit 580 may be implemented, at least in part, by a software module resident, at least in part, in a memory and executed by one or more processors.

Exemplary Image-Capturing Telecommunications Device

Figure 6:
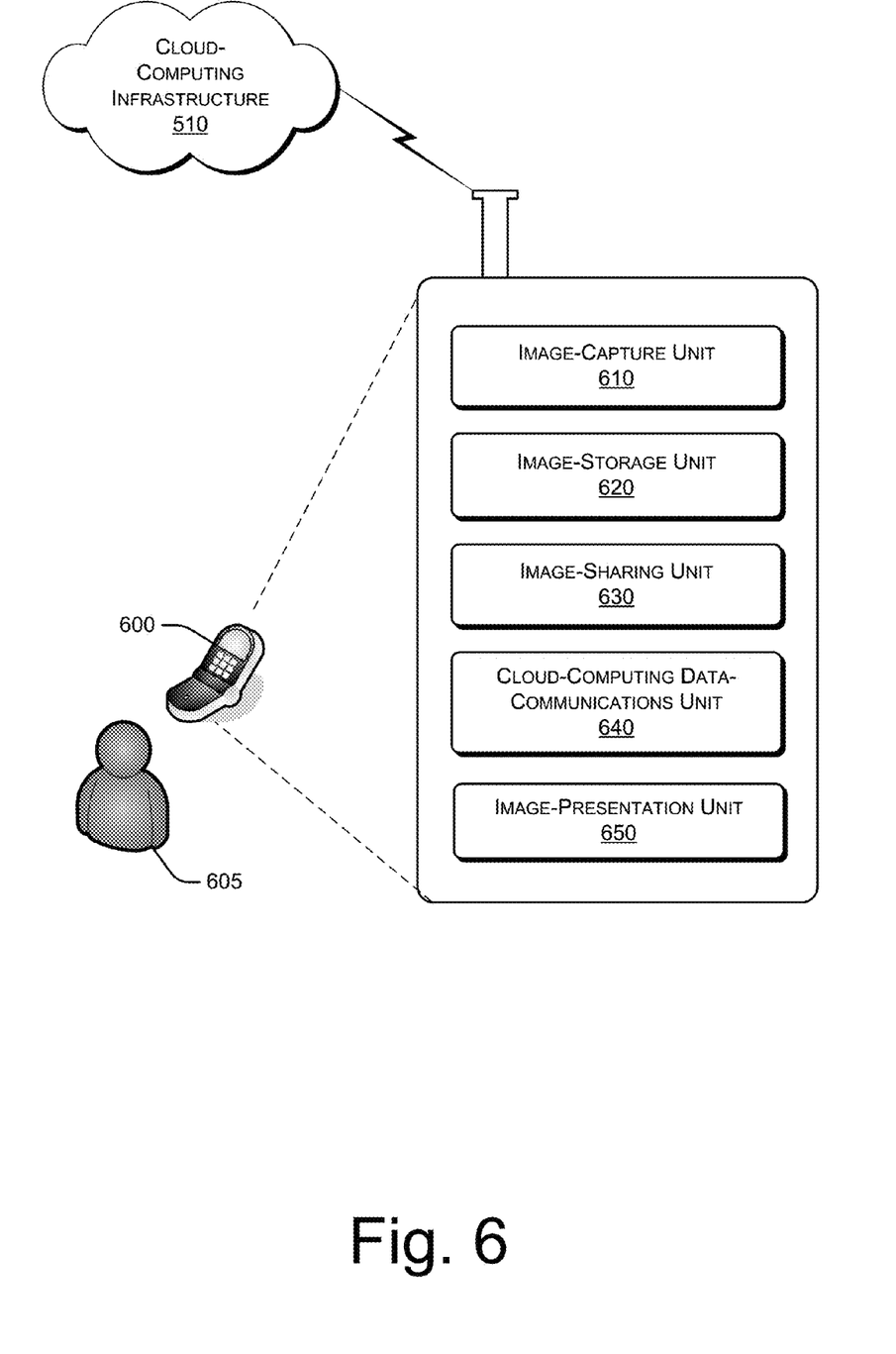
FIG. 6 shows image-capturing telecommunications apparatus that is configured to implement the techniques described herein for automatic selection of one or more digital images from a multi-sourced collection of such images.

FIG. 6 shows an exemplary image-capturing telecommunications device 600 that implements, at least in part, the techniques described herein for automatic selection of a group of photos from a larger set of photos collected from multiple sources. The device 600 is one of those sources.

The image-capturing telecommunications device 600 may have the following components: an image-capturing unit 610, an image-storage unit 620, an image-sharing unit 630, a cloud-computing data-communications unit 640, and an image-presentation unit 650.

The image-capturing unit 610 is configured, designed, and/or programmed to capture digital images. That is, a person using the device 110 may take photos using the image-capturing unit 610 of the device.

The image-capturing unit 610 includes various lower-level camera components for capturing still digital images (i.e., photographs or photos) and/or moving digital images with audio (i.e., digital video). The camera components may include (by way of example and not limitation): digital sensor chip (e.g., CCD (charge-coupled device) or CMOS (complementary metal-oxide-semiconductor)), lenses, display, viewfinder, and the like. The image-capturing unit 610 may be implemented, at least in part, by a software module resident, at least in part, in the device's memory and executed by one or more processors of the device 600.

The image-storage unit 620 is configured, designed, and/or programmed to store digital images and possibly other forms of data and software. That is, the device 600 stores the photos taken by the person using the device 600 on the image-storage unit 620 of the device.

The image-storage unit 620 includes one or more lower-level memory or storage components for storing still digital images (i.e., photographs or photos) and/or moving digital images with audio (i.e., digital video). The memory or storage components may be volatile or non-volatile, dynamic or static, read/write-able or read only, random- or sequential-access, location- or file-addressable, and the like. The memory or storage components may be magnetic, optical, holographic, and the like. The memory or storage components may be internal to the device 600, attached externally to the device 600, or available via data communications (e.g., on the network).

The images stored by the image-storage unit 620 may include images captured by the image-capturing unit 610, and/or may include images obtained from sources other than the image-capturing unit 610. For example, images may be transferred to the device 600 using one or more wireless and/or wireline interfaces from the cloud-computing infrastructure 510.

The image-sharing unit 630 is designed, configured, and/or programmed to share one or more of the stored captured digital images via the cloud-computing infrastructure 510. Sharing may include sending a notice about one or more images to one or more particular users. Sending a notice includes (but is not limited to): sending copies of a shared image; sending a link to one or more shared images, posting a link to one or more shared images; and uploading shared images to a website, blog, social-networking service, photo/video sharing services, or the like.

The cloud-computing data-communications unit 640 is designed, configured, and/or programmed to communicate with the cloud-computing infrastructure via a data-communications link. Furthermore, the cloud-computing data-communications unit 640 is designed, configured, and/or programmed to send and/or receive a group of digital images to/from the cloud-computing infrastructure 510. Instead of sending/receiving the images themselves, the cloud-computing data-communications unit 640 may send/receive information about such images, which may include links to one or more of the images. In one or more implementations, that received group includes at least one of the digital images shared by the image-sharing unit 630.

The image-presentation unit 650 is designed, configured, and/or programmed to present the group of digital images to a user 605 of device 600. The group of digital images is provided by the cloud-computing infrastructure 510. The group is a superlative (e.g., top-ranked) subset of a set of digital images. The subset is ranked by the cloud computing infrastructure 510 in accordance with weighted selection criteria.

The image-presentation unit 650 includes various lower-level audio/visual presentation components for showing still digital images (i.e., photographs or photos) and/or moving digital images with audio (i.e., digital video). The audio/visual components may include (by way of example and not limitation): a liquid crystal display (LCD), a flat panel, organic light-emitting diode (OLED) displays, pico-projection displays, a solid state display or other visual display devices, speakers, and the like. The image-presentation unit 650 may be implemented, at least in part, by a software module resident, at least in part, in the device's memory and executed by one or more processors of the device.

Additional and Alternative Implementation Notes

Digital cameras and camera-equipped mobile phones are depicted herein (such as image-capturing devices 104a, 104b, and 104c) as being examples of sources of photos for one or more implementations of the techniques described herein. However, other image-capturing devices may be sources of photos for this and other implementations of the techniques described herein. Examples of other image-capturing devices that may be sources include (by are not limited to): tablet-based computer, other handheld computer, netbook, computer, digital camera, digital camcorder, handheld multimedia device, digital single-lens reflex (DSLR) camera, GPS navigational system, vehicle-based computer, any camera-equipped computing device or portable electronic.

In addition, non-camera-equipped sources may be utilized for this and other implementations of the techniques described herein. These non-camera-equipped sources include other devices or services where images are stored, collected, accessed, handled, manipulated, and/or viewed. Examples of such alternative image sources include (but are not limited to): a photo-processing kiosk, portable and removable storage media or device (e.g., CD-ROM, DVD-ROM, other optical media, USB flash drive, flash memory card, external hard drive, etc.), electronics with radio-frequency identification (RFID), a social-networking services (e.g., Facebook™, MySpace™, Twitter™, Linkedin™, Ning™, and the like), and photo/video sharing services (e.g., Flickr™, Photobucket™, Picasa™, Shutterfly™, and the like).

One or more implementations of the techniques described herein may include an initial training session for an exemplary auto-selecting device or service to learn what makes a photo and/or video clip superlative (e.g., best or worst) in the user's opinion. This training may be repeated from time to time. This training will set the weight values of one or more of the weighted criteria. There may be various profiles for specific conditions and situations where the weighted criteria have their own trained values. Each user of the exemplary auto-selecting device or service may have their own customized weighted criteria values and profiles of such values. The exemplary may have a default set of values or profiles assigned. That default set or profiles may be extrapolated from a statistically evaluation (e.g., mean or median) of the trained values derived from multiple users.

Instead of a training session, one or more implementations may take advantage of a system of user-ratings (e.g., thumbs up/down or 1 to 5 stars) for photos and/or video clips. These user-rating are effective data for training the exemplary video-capture device to learn what makes a photo and/or video clip superlative (e.g., best or worst) in the user's opinion. In some implementations, the user may define values for one or more of the weighted criteria. This may be accomplished using, for example, slider-bar user interface for the user to adjust weights assigned to particular criteria or to categories of criteria.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or some combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

What is claimed is:

1. A method comprising:
   obtaining a set of digital images from multiple different image-capturing apparatuses;
   clustering the set of digital images into multiple clusters;
   selecting, based upon weighted selection criteria, at least one subset of digital images of the set, the selected at least one subset of digital images including digital images from at least two of the multiple clusters;
   sending the selected subset of digital images to a computing apparatus communicatively coupled to a cloud computing infrastructure;
   attaining feedback regarding user-acceptability of the selected subset of digital images; and
   in response to attained feedback indicating a lack of user-acceptability of the selected subset of digital images, performing a reweighted selection of at least one updated subset of digital images of the set,
   wherein the attained feedback is at least one of a user initiated addition of a digital image to the selected subset of digital images or a user initiated removal of a digital image from the selected subset of digital images.

2. A method as recited in claim 1, wherein the obtaining comprises:
   acquiring, via a data-communications network, multiple digital images from the multiple different image-capturing apparatuses;
   storing the set of digital images within the cloud computing infrastructure, wherein the set of digital images includes digital images acquired from the multiple different image-capturing apparatuses.

3. A method as recited in claim 1, wherein the obtaining comprises:
   acquiring links to each of multiple digital images stored in multiple different image-capturing apparatuses that are communicatively coupled to the cloud computing infrastructure via a data-communications network;
   collecting the acquired links to define, at least in part, the set of digital images.

4. A method as recited in claim 1, wherein the selecting includes:
   segregating the set of digital images into an intermediate grouping based upon whether the digital images match one or more specified criteria;
   ranking the digital images of the segregated intermediate grouping based upon multiple weighted criteria;
   designating an allotment of similarly ranked digital images of the segregated intermediate grouping as the selected subset of digital images.

5. A method as recited in claim 4, wherein the designated allotment includes digital images that are top or bottom ranked amongst the segregated intermediate grouping.

6. A method as recited in claim 4, further comprising calculating a cardinality of the designated allotment based upon a percentage of the segregated intermediate grouping.

7. A method as recited in claim 1, wherein the performance of reweighted selection includes:
   adjusting one or more weight values of the weighted criteria;
   updating the subset of digital images of the set by reselecting a collection of digital images from the set based upon the adjusted weighted criteria.

8. A method as recited in claim 1, wherein the weighted criteria are selected from a group of digital-image properties consisting of an identification of an image-capturing apparatus that captured a digital image and an identification of a user of an image-capturing apparatus that captured a digital image.

9. A method as recited in claim 1, wherein the weighted criteria are selected from a group of digital-image properties consisting of image-acquisition location, focus, contrast, shake, red-eye, image content includes a person designated as a favorite of the user, image content includes a person in a list of contacts of the user, photo is tagged, user-added criteria, photo was auto-corrected, photo was post-processed, flash used, and social-network ranking of a digital image.

10. The method as recited in claim 1, wherein the reweighted selection includes using at least one or more update of the weighted selection criteria, the at least one or more update of the weighted selection criteria having at least one updated weight value compared to at least one weight value associated with the weighted selection criteria, the at least one update weight value established based on the at least one of the user initiated addition of a digital image to the selected subset of digital images or the user initiated removal of a digital image from the selected subset of digital images.

11. One or more processor-readable storage devices having processor-executable instructions embodied thereon, the processor-executable instructions, when executed by one or more processors, direct the one or more processors to perform operations comprising:
   obtaining a set of digital images from multiple different image-capturing apparatuses;
   clustering the set of digital images into multiple clusters;
   selecting, based upon weighted selection criteria, at least one subset of digital images of the set, the selected at least one subset of digital images including digital images from at least two of the multiple clusters, wherein the selecting includes:
      grouping the set of digital images into an intermediate grouping that includes two or more of the digital images of the set;
      ranking the digital images of the intermediate grouping based upon multiple weighted criteria; and designating an allotment of ranked digital images of the intermediate grouping as the selected subset of digital images;

making the selected subset of digital images available to a computing apparatus communicatively coupled to a cloud computing infrastructure;

attaining feedback indicating a lack of user-acceptability of the selected subset of digital images; and performing a reweighted selection of at least one updated subset of digital images of the set.

12. One or more processor-readable storage devices as recited in claim 11, further comprising:

attaining feedback from a user, via the user-interface of the computing apparatus, regarding user-acceptability of the selected subset of digital images;

in response to attained user-feedback indicating a lack of user-acceptability of the selected subset of digital images, performing a reweighted selection of at least one updated subset of digital images of the set.

13. One or more processor-readable storage devices as recited in claim 11, wherein the obtaining comprises:

acquiring, via a data-communications network, multiple digital images from the multiple different image-capturing apparatuses;

storing the set of digital images within the cloud computing infrastructure, wherein the set of digital images includes digital images acquired from the multiple different image-capturing apparatuses.

14. One or more processor-readable storage devices as recited in claim 11, wherein the obtaining comprises:

acquiring links to each of multiple digital images stored in multiple different image-capturing apparatuses that are communicatively coupled to the cloud computing infrastructure via a data-communications network;

collecting the acquired links to define, at least in part, the set of digital images.

15. One or more processor-readable storage devices as recited in claim 11, wherein the performance of reweighted selection includes:

adjusting one or more weight values of the weighted criteria;

updating the subset of digital images of the set by reselecting a collection of digital images from the set based upon the adjusted weighted criteria.

16. One or more processor-readable storage devices as recited in claim 11, wherein the weighted criteria are selected from a group of digital-image properties consisting of an identification of an image-capturing apparatus that captured a digital image and an identification of a user of an image-capturing apparatus that captured a digital image.

17. One or more processor-readable storage devices as recited in claim 11, wherein the weighted criteria are selected from a group of digital-image properties consisting of image-acquisition location, focus, contrast, shake, red-eye, image content includes a person designated as a favorite of the user, image content includes a person in a list of contacts of the user, photo is tagged, user-added criteria, photo was auto-corrected, photo was post-processed, flash used, and social-network ranking of a digital image.

18. One or more processor-readable storage devices as recited in claim 11, wherein performing the reweighted selection includes using at least one or more update of the weighted selection criteria, the at least one or more update of the weighted selection criteria having at least one updated weight value compared to at least one weight value associated with the weighted selection criteria, the at least one update weight value established based on the at least one of the user initiated action.

* * * * *